(12) United States Patent
Wolfson

(10) Patent No.: US 7,617,156 B1
(45) Date of Patent: Nov. 10, 2009

(54) METHOD FOR MINIMIZING OVERDRAFT CHARGE-OFF

(75) Inventor: Steven Wolfson, Scituate, MA (US)

(73) Assignee: Carreker Corporation, Dallas, TX (US)

( * ) Notice: Subject to any disclaimer, the term of this patent is extended or adjusted under 35 U.S.C. 154(b) by 319 days.

(21) Appl. No.: 11/457,698

(22) Filed: Jul. 14, 2006

(51) Int. Cl.
*G06Q 40/00* (2006.01)
(52) U.S. Cl. ...................................................... 705/42
(58) Field of Classification Search ................ 705/1–45; 235/380; 702/188; 438/14; 221/237; 324/765
See application file for complete search history.

(56) References Cited

U.S. PATENT DOCUMENTS

| | | | | |
|---|---|---|---|---|
| 6,088,686 | A * | 7/2000 | Walker et al. | 705/38 |
| 6,658,393 | B1 * | 12/2003 | Basch et al. | 705/38 |
| 6,839,682 | B1 * | 1/2005 | Blume et al. | 705/10 |
| 6,957,171 | B2 * | 10/2005 | White et al. | 702/188 |
| 2003/0055783 | A1 * | 3/2003 | Cataline et al. | 705/40 |
| 2005/0273430 | A1 * | 12/2005 | Pliha | 705/42 |
| 2005/0279824 | A1 * | 12/2005 | Anderson et al. | 235/380 |
| 2007/0203827 | A1 * | 8/2007 | Simpson et al. | 705/38 |
| 2008/0021813 | A1 | 1/2008 | Simpson et al. | |

OTHER PUBLICATIONS

Australia and NZ Banking Group Signs Fraud Protection Contract, AsiaPulse News, Aug. 15, 2001.*

* cited by examiner

*Primary Examiner*—Mary Cheung
*Assistant Examiner*—Tien C Nguyen
(74) *Attorney, Agent, or Firm*—Sutherland Asbill & Brennan LLP

(57) ABSTRACT

A method for minimizing overdraft charge-off in a bank account includes:
(a) identifying a plurality of factors that can result in a bank account charge-off;
(b) building a case history database of bank account holder information based upon a plurality of data elements associated with each of the plurality of factors;
(c) creating numeric and/or categorical representations of the bank account holder information for each of the bank accounts in the case history database;
(d) tabulating the numeric and/or categorical representations and the data elements for the bank accounts in the case history database;
(e) combining certain ones of the numeric and/or categorical representations to separate the bank accounts in the case history database into a plurality of risk groups, each risk group having an associated probability of charge-off; and
(f) optimizing, for each of the plurality of risk groups, a bank profit, by setting overdraft limits.

50 Claims, 11 Drawing Sheets

|  | Telltale 1 | Telltale 2 | ... | Telltale t | ... | Telltale T |
|---|---|---|---|---|---|---|
| Case History 1 | $V_{11}$ | $V_{12}$ | ... | $V_{1t}$ | ... | $V_{1T}$ |
| Case History 2 | $V_{21}$ | $V_{22}$ | ... | $V_{2t}$ | ... | $V_{2T}$ |
| ... | ... | ... | ... | ... | ... | ... |
| Case History h | $V_{h1}$ | $V_{h2}$ | ... | $V_{ht}$ | ... | $V_{hT}$ |
| ... | ... | ... | ... | ... | ... | ... |
| Case History H | $V_{H1}$ | $V_{H1}$ | ... | $V_{Ht}$ | ... | $V_{HT}$ |

FIGURE 4

|  | Charge-Off Case Histories | | Cure Case Histories | | Control Case Histories | | ROC Lift |
|---|---|---|---|---|---|---|---|
|  | 95% Avg. | Full Avg. | 95% Avg. | Full Avg. | 95% Avg. | Full Avg. |  |
| Telltale 1 | ... | ... |  | ... | ... | ... | ... |
| Telltale 2 | ... | ... |  | ... | ... | ... | ... |
| ... | ... | ... |  | ... | ... | ... | ... |
| Telltale t | ... | ... |  | ... | ... | ... | ... |
| ... | ... | ... |  | ... | ... | ... | ... |
| Telltale T | ... | ... |  | ... | ... | ... | ... |

FIGURE 5

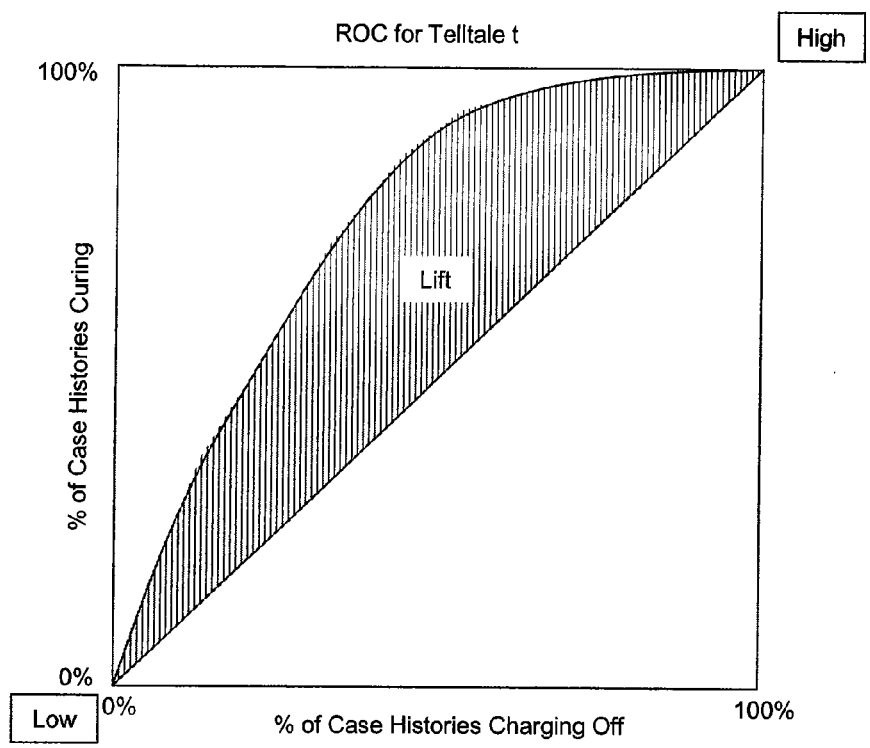
FIGURE 6
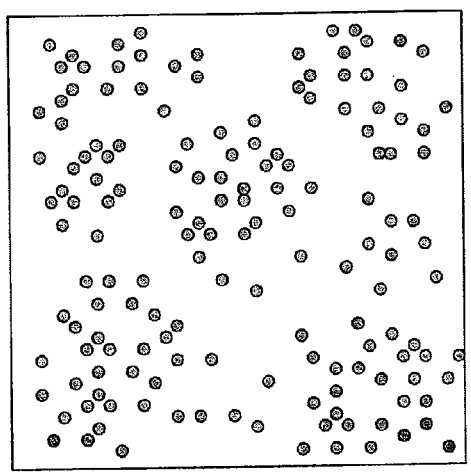 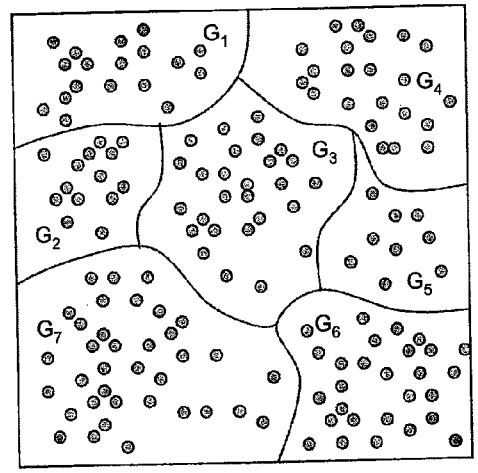
FIGURE 7a    FIGURE 7b

| | | Test Limits | | | | | |
|---|---|---|---|---|---|---|---|
| | | 0 | 5 | 10 | ... | L | ... | 2500 |
| Risk Groups | $G_1$ | $P_1(0)$ | $P_1(5)$ | $P_1(10)$ | ... | $P_1(L)$ | ... | $P_1(2500)$ |
| | $G_2$ | $P_2(0)$ | $P_2(5)$ | $P_2(10)$ | ... | $P_2(L)$ | ... | $P_2(2500)$ |
| | ... | ... | ... | ... | ... | ... | ... | ... |
| | $G_n$ | $P_n(0)$ | $P_n(5)$ | $P_n(10)$ | ... | $P_n(L)$ | ... | $P_n(2500)$ |
| | ... | ... | ... | ... | ... | ... | ... | ... |
| | $G_N$ | $P_N(0)$ | $P_N(5)$ | $P_N(10)$ | ... | $P_N(L)$ | ... | $P_N(2500)$ |

METHOD FOR MINIMIZING OVERDRAFT CHARGE-OFF

TECHNICAL FIELD OF THE INVENTION

The present invention relates to the processing of banking transactions, and more particularly to a method for minimizing overdraft charge-off.

BACKGROUND OF THE INVENTION

When a bank customer attempts to make a check card purchase, withdraw funds from an ATM or make a teller withdrawal, his/her bank must determine whether the customer has a sufficient balances to cover the item, and, if not, whether to authorize the purchase or withdrawal into an overdrawn position or decline the transaction. Similarly, when one or more bank customer check s (or other returnable items) are processed in the nightly posting batch run, the bank must determine whether to pay or return each item that, if posted, would overdraw the customer's account. Each day any given bank may make millions of such authorization/decline and pay/return decisions. Each day the banking community as a whole makes trillions of such decisions. From a customer service perspective, banks would prefer to authorize and pay such transactions. Declines and returns are embarrassing to customers. Declines often lead to less frequent use of a given check card. Returns can lead to additional vendor assessed fees for bounced checks and/or late payment. So customers and banks alike regard it as better customer service when the bank covers an overdraft transaction, but some fraction of the overdrafts thus generated are never repaid. Indeed, at a typical bank, between 4% to 5% of those accounts allowed to overdraw will never fully repay leaving the bank to charge off the negative balance and absorb the loss.

If a bank knew in advance that a given account was headed for charge-off, the bank could forgo decisions that would take that account's balance into a negative position, and authorize and pay only those items where there was no probability of charge-off. Such precise foreknowledge is, of course, impossible. But it is possible to ascertain the probability that a given account will charge off and, based on that probability, a bank can make better decisions about when to authorize and/or pay transactions into overdraft. While there are a variety of software systems and methodologies on the market that address the "overdraft" problem, none function to ascertain either the probability of charge-off or the probability of cure (i.e. the probability that an account with a negative balance will pay back what is owed returning to a positive balance).

Current software systems and methodologies are based on either fixed or user-definable scoring systems. The score is used to control overdrafts through a single quantity called the overdraft limit. The overdraft limit for an account is the maximum negative balance into which a bank will either authorize or pay a transaction.

Overdraft limits are generated by evaluating certain quantities of interest, which, though similar among existing approaches, may vary from one approach to the next. Often, these quantities represent values already available in the DDA (Demand Deposit Account) system, which is the system of record for the balances of each account and for other information about the account and how it is to be processed. Based on the value of one of these quantities, the overdraft limit for the associated account may be either incremented or decremented according to the scoring rules for quantity.

Few of these software systems and methodologies offer objective justification for the inclusion of a particular quantity; none show how these quantities relate to charge-off and cure behavior. In fact, demonstrating such a relationship is not easy because of the time spans involved. At the time when an authorization or pay decision is made, it may require 45 days or more (depending on the charge-off process of the bank) before it is clear whether or not an account charged off and, if so, how much money was lost. Since some fraction of charge-offs are eventually recovered, post charge-off history needs to be studied to determine net losses. Similarly, the decision itself relies on characteristics of the account gathered over some suitable period of time leading up to the decision. (See FIG. 1.) Thus, an objective analysis of the predictive power of any given characteristic requires data collected over an extended period of time. Without such data, one may appeal to intuition, but one cannot bring the power of data mining to bear to assess where one's intuition is correct.

As compared to other situations where banks put principal at risk in order to service customers and assess fees or interest, the overdraft space is very profitable. (Banks do not call overdrafts loans, because they are not committed to extending the overdraft and to make such a commitment would subject the extension to lending regulations which, in many ways, are more stringent than those governing overdrafts.) Overdraft revenue has been made increasingly profitable over the last two decades through a series of marketing, pricing and processing reforms that have significantly enhanced overdraft revenue.

One side effect of these reforms is that overdraft charge-offs have risen disproportionately with revenue. Since the revenues still far outweigh charge-offs, overdrafts are still a very profitable business, but it is clear that the current software systems and methodologies employed to control losses through the setting of overdraft limits are deficient. For this reason a need exists for better, more robust and responsive approaches to address the overdraft problem.

SUMMARY OF THE INVENTION

In accordance with the present invention, a method for minimizing overdraft charge-off in a bank account includes:

(a) identifying a plurality of factors that can result in a bank account charge-off;

(b) building a case history database of bank account holder information based upon a plurality of data elements associated with each of the plurality of factors;

(c) creating numeric and/or categorical representations of the bank account holder information for each of the bank accounts in the case history database;

(d) tabulating the numeric and/or categorical representations and the data elements for the bank accounts in the case history database;

(e) combining certain ones of the numeric and/or categorical representations to separate the bank accounts in the case history database into a plurality of risk groups, each risk group having an associated probability of charge-off; and (f) optimizing, for each of the plurality of risk groups, a bank profit, by setting overdraft limits.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which:

FIG. 4 illustrates a table of telltales for each case history;

FIG. 5 illustrates a format in which telltale statistics are gathered to support further analysis;

FIG. 6; illustrates a typical ROC (Receiver Operating Characteristic) curve used to determine the stand-alone predictive power of a given numeric telltale;

FIG. 7 illustrates self-similar case histories being partitioned into risk groups;

DESCRIPTION OF THE PREFERRED EMBODIMENTS

Categories of Risk Predicting Factors

Figure 1:
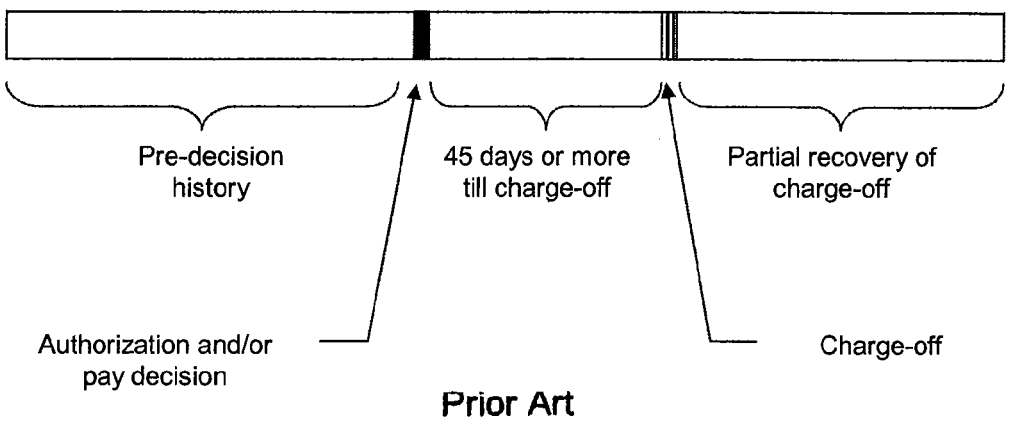
FIG. 1 illustrates a timeline for a typical case history including a charge-off.

The present invention examines six categories of characteristics in order to ascertain the probability that a given account will charge-off. Balance's, Transactions, Exceptions, Account Information, Customer Information, and Relationship Information. Within each category, are identified various "conceptual telltales." As used herein, a conceptual telltale is a particular characteristic of the pre-decision case history of an account, hypothesized to have value in predicting charge-off risk.

For any given conceptual telltale, there will be numerous ways the telltale can be represented as either a number or as categorical information. As an example, consider the account category conceptual telltale "age of the account at the time the overdraft decision is to be made" (or "age of account" for short). One could represent this as a number in days, in (30-day) months, as the logarithm of the number days old or in many other ways. One could also represent age of account as a set of categories: Just Opened (0-29 days), New (30-89 days), Moderate (90-364 days), Mature (1-3 years), Long Lived ($\geq$3 years). Certain representations may lead to greater predictive power, while others lead to less, and often several representations will have essentially in the same predictive power. The problem of identifying the most "powerful" representation of a given conceptual telltale will be further described.

The present invention identifies representations of distinct conceptual telltales with combined predictive power exceeding that of any single factor. For a variety of reasons, seemingly different conceptual telltales are not always completely independent. Consider for example the transaction category conceptual telltale "annualized average deposits." While not equivalent to an account holder's income, in most cases it is a good proxy for it. One reason people have higher incomes is because their skill set commands a higher wage or salary; another reason is that most people earn more as they get older and more experienced. New accounts are not always young account holders, but there is a positive correlation. Thus, a priori, it is not clear how much additive value can be obtained by using age of account and annualized average deposits together to predict charge-off risk.

Individual telltales may remain constant, change slowly or change rapidly (sometimes even within the course of a day). One conceptual telltale, for example, deposit pattern interruption, is subject to dramatic swings. Clearly, bank receipt of a new deposit (or, in the case of ACH, receipt of advanced notice that such a deposit is queued up and may be posted on a future date) signals that in some sense deposits are no longer interrupted. While it is impractical for banks to be recalculating individual telltale values across their account base on a real time basis throughout the day, it is possible to project the future values that certain rapidly changing telltales would take should certain transaction types take place or transaction types with certain values materialize.

Sometimes it is useful to combine two or more telltales from possibly different categories into a single representation. As an example, consider the sex of the account holder. On the surface, this would appear to fall within the Customer Information category of information, but some accounts are held by businesses for which sex is obviously meaningless. Most banks and bankers would regard the type of account as Account Information and therefore be led to think of the distinction as to whether an account is business or personal as being an Account distinction. Sex, on the other hand is a Customer distinction. Therefore, the categorical representation, Male, Female or Business, is actually a hybrid of the Account Information and Customer Information categories.

Collecting Data and Assembling Case Histories

As previously stated, in order to explore the predictive power of a given conceptual telltale one must be able to study how accounts with differing values for various representation of that conceptual telltale appear based on all that is known at the time of an overdraft decision with the eventual charge-off/cure behavior of the account. One prepares for such an investigation by either finding institutions with enough retained history to construct the required data set or by arranging to collect the information over a period of months on a go forward basis. The present invention relied on the former method to arrive at its initial design. As will be discussed below, a computer system for implementing one embodiment of the system will rely on the second method.

Figure 2:
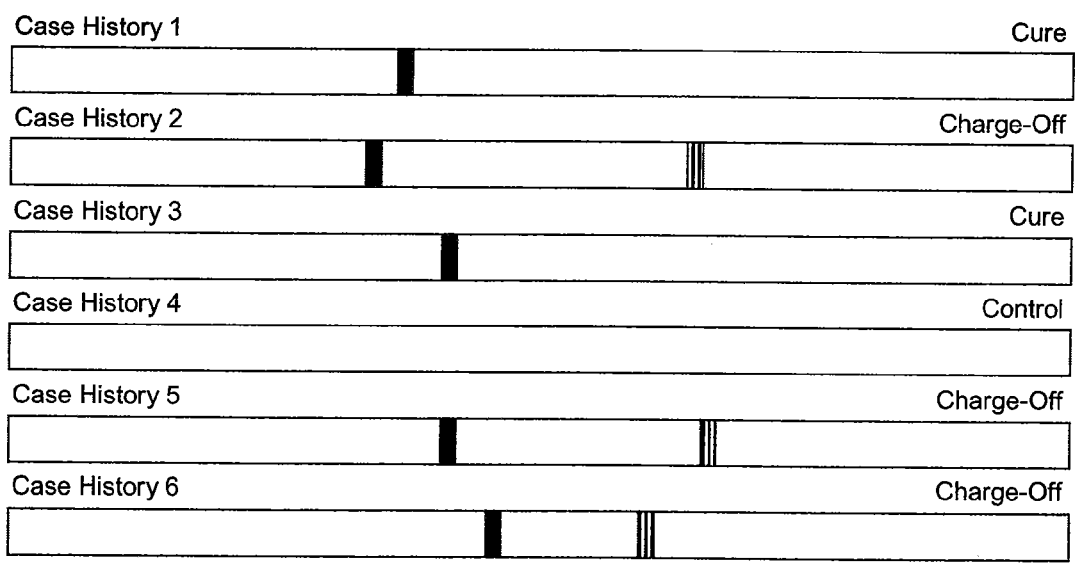
FIG. 2 illustrates a set of timelines for six different case histories, some of which cure, some of which charge-off and some of which (control case histories), include no overdraft incidents.

A "case history" is defined herein as the totality of tracked balances, transactions and exceptions over a period of time along with the more static information about the account, customer and relationship. There are three types of case histories of interest. FIG. 2 illustrates examples of each:

Charge-Off—Where an account overdraws due to one or more authorization or pay decisions and later charges-off. (Case histories 2, 5 & 6)

Cure—Where an account overdraws due to one or more authorization or pay decisions and later restores a non-negative balance. (Case histories 1 & 3)

Control—Where an account has no overdrafts. (Case history 4)

To assemble case history data, actual bank data for balance, transaction, exception, account, customer and relationship information was collected for a combination of charge-off, cure and control accounts. In order to have a statistically valid sample of charge-off case histories, one must examine all charge-offs due to overdrafts initiated over an extended period of time (the "critical period"). One must also examine cure case histories, which are accounts that overdrew during the critical period and later returned to a positive balance (even if they subsequently charged off due to an even later overdraft that initiated after the critical period.) And, lastly, one must examine control case histories, which are accounts whose balance never went from positive (or zero) to negative throughout the critical period.

The bank data comprising the case histories was extracted, transformed and loaded into a case history database containing all the information obtained. Because of the relative frequencies of charge-off, cure and control accounts, this database contained more cure case histories than charge-offs and more control cases histories than cures.

Figure 3:
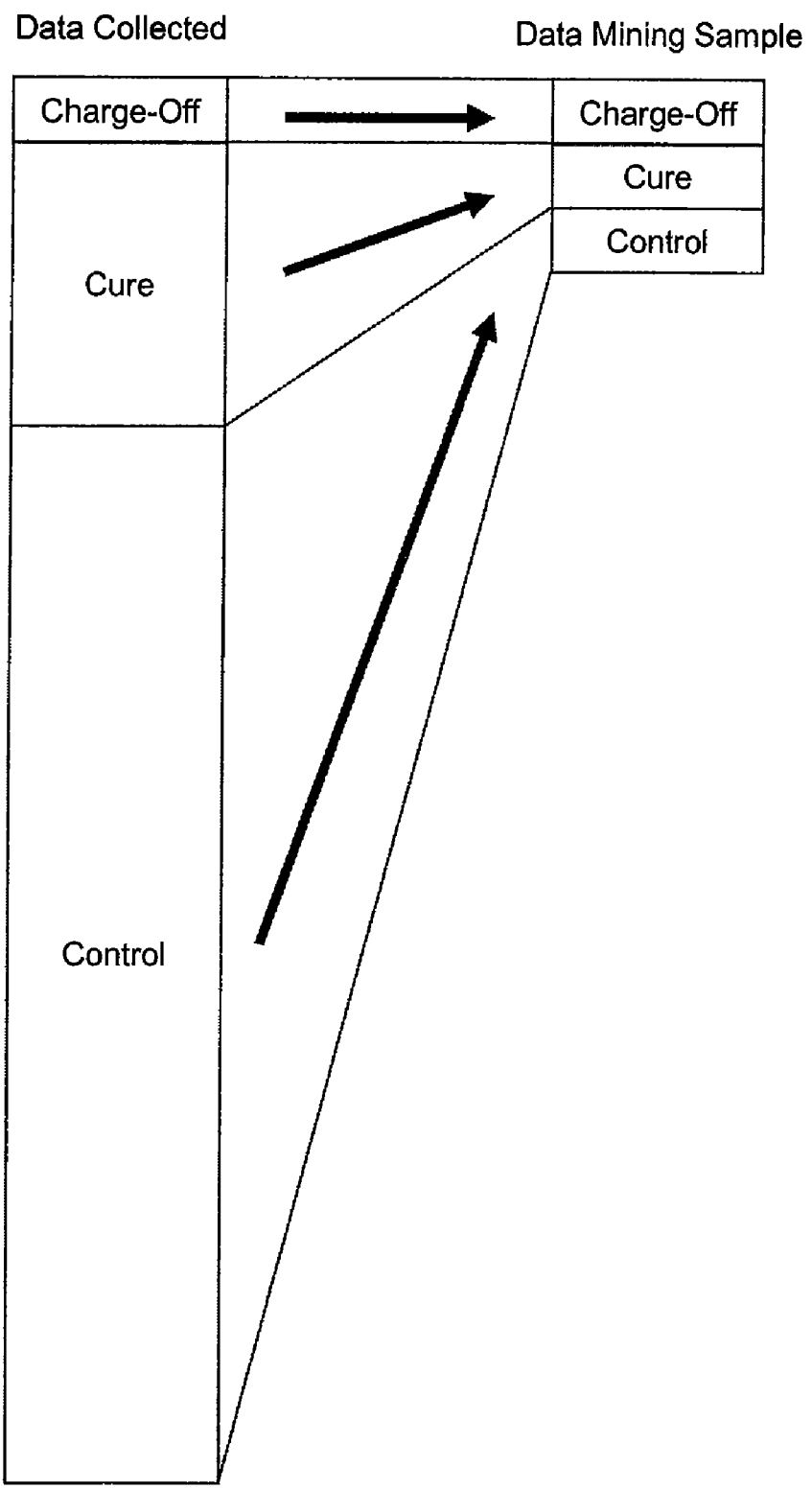
FIG. 3 illustrates available sets of case histories reduced to more manageable sample sets.

In order to support the analysis and data mining (described below), a subset of this database was formed with all or nearly all of the charge-off accounts and roughly equal numbers of cure and control accounts selected randomly from the starting database. (See FIG. 3.)

Finally, a third database, the Data Mining Source Database, is constructed, which includes a row for each case history and a column for each individual telltale. Individual telltales may be one of several representation of a single conceptual telltale. (See FIG. 4).

Determining the Most Promising Representation of Each Conceptual Telltale

Where there is more than one representation for an individual telltale, it becomes important to identify the most powerful predictor of charge-off. It is also important to identify the relative predictive power of the conceptual telltales by comparing the "best" representation for each. To do this two techniques are required: averages and ROC curves.

Averages

For numerical telltales, the average value of the telltale for charge-off cure and control subsets of the Data Mining Source Database is computed. Categorical telltales must be handled differently. To analyze, for example, the sex of the primary account holder, one could create a representation that included two options, M and F. But one could equally establish two separate representations male and female, each taking values of 1 for yes and 0 for no. One can now compute the average value for male and female respectively, although the second of these is redundant information. For broader categories with n unique options (and nulls, meaning no information available, must be treated as one of the options), n−1 of the averages will be independent and the remaining one holds no new information.

A second nuance of exploring averages is that typically case history data will include one or several case histories with telltale values far in excess of the norm. Since it is desired to compare the averages of the three groups, charge-off, cure and control, wherever there is danger that a single case history (or small number of case histories) might distort the average value for one of these groups and make it "seem" larger than the others, there is a need to eliminate the effect of these case histories from the average analysis. In statistics, this is called the outlier problem and there are several methods available for calling outliers to produce averages (and other statistic) more representative of the population under consideration.

One embodiment of the present invention uses the relatively simple technique of finding the average for 95% of case histories in a group (charge-off, cure or control) with lowest values for that telltale. By averaging the vast majority of the case histories in each group and ignoring enough to weed out any outliers, it is possible to obtain a telltale average that, if significantly different across the groups, is indicative of potential predictive power. (See FIG. 5.)

ROC Curves and Lifts

ROC stands for Receiver Operating Statistics. ROC curves and their associated lifts are commonly used to identify the potential power of a given predictor such as a given individual telltale which may be one of several representing a conceptual telltale. (See FIG. 6.)

In ROC analysis, one sorts all charge-off and cure case histories low-to-high according to the individual telltale being analyzed. If more of the charge-off case histories "bubble" to the tope of list or "sink" to the bottom, that is an indication that the telltale takes on rather different values for charge-off case histories than it does for cure case histories. If instead, the charge-off and cure case histories are fairly randomly distributed up and down the list, that is an indication that the telltale does little to distinguish between charge-off and cure.

If one starts at the low end of the telltale value list and works toward the high end, plotting the fraction of charge-off histories encountered vs. the fraction of cure case histories encountered, one generates a curve similar to that shown in FIG. 6. The area between the telltale curve and the 45° line associated with a random mixing of charge-off and cure case histories give the lift for that individual telltale. Once calculated, these lifts are added to the table with the full and 95% averages to provide a comprehensive summary of the standalone predictive power of each individual telltale.

In one embodiment of the invention, where there are multiple individual telltale representations of a single conceptual telltale, the one with the greatest lift is taken as the most likely candidate to carry forward to the next step. Other statistical techniques also serve the same purpose.

Data Mining for Risk Group Clusters

At the time an overdraft decision is to be made, one has the values of all the account's telltales based on the behavior of the account up to that time. From other data collected, it is known which of these accounts will charge-off eventually. Now we wish to identify self-similar collections of account histories with respect to their probability of charge-off and likelihood of curing. (See FIG. 7.) In FIG. 7a, an array of account case histories is shown 2-dimensionally for convenience. The position of each dot represents the information available to the system at the time of overdraft decision. From this information, a decision must be made about how much risk to take. In FIG. 7b, the same array is shown with boundary lines identifying the "natural" risk group clusters: $G_1$, $G_2 \ldots, G_7$. Case histories within a cluster tend to be similar, in an appropriate sense, to others within the same cluster but different from those in other clusters.

In data mining this identification is called cluster detection, and there are a variety of techniques, including k-means clustering and neural nets for carrying out this step. In one embodiment of the present invention another cluster detection technique called decision trees is used to partition charge-off and cure case histories into risk group clusters. After partitioning, all the case histories in a given risk group will be similar with respect to their combination of telltale values, while all those case histories in different risk groups will tend to have rather different combinations of values. Decision trees have the advantage of generating an "explainable" result that can be readily traced through.

Decision tree algorithms start with the entire case history population (here just charge-off and cures) and selected the best telltale and the best splitting value (in an appropriate sense) for dividing the population up into the two most significantly different subpopulations. Although the final charge-off/cure result for each case history is carried along through the splitting, it is not used to generate a split. Since that future is not known at the time of the overdraft decision, its use would not be fair. Instead, the goal is to use only those things known at the time of overdraft decision to predict charge-off and cure outcomes.

Figure 8:
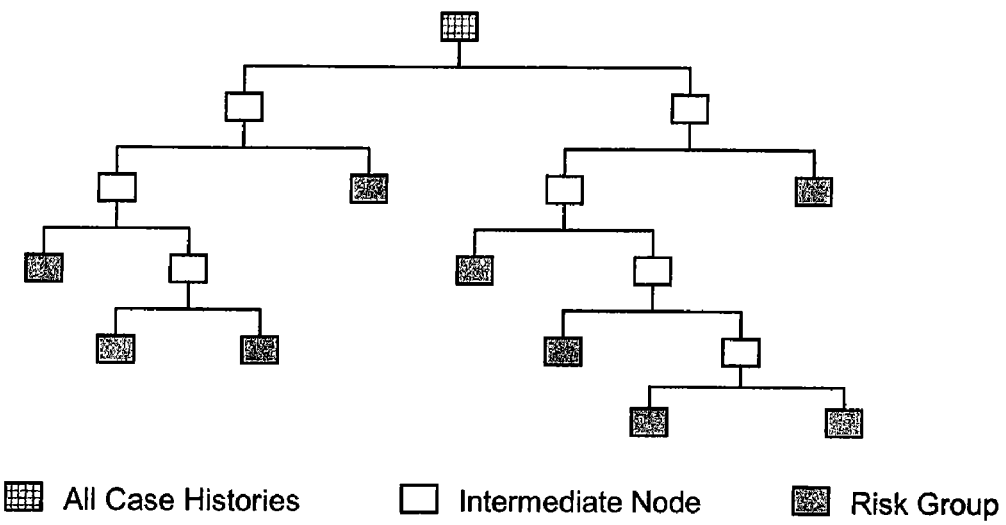
FIG. 8 illustrates a simple binary decision tree demonstrating that end nodes need not all lie at the same level (i.e. at the same number of binary decisions away from the root node of the tree)

After the initial split, additional splits are made further down the tree. Various data mining algorithms are employed to determine the details of each split and to decide when to stop splitting further so as to avoid over-fitting the data. (See FIG. 8.)

One standard output of decision tree building tools is a set of statistics telling how well the risk groups (end or leaf nodes of the tree) predict the attributes one is investigating, in this case charge-off and cure. Trees are built with different combinations of telltales and with different combinations of tree-building options. The numbers of potential combinations grows large quickly. Sticking with individual telltales with the highest ROC curve lift for each conceptual telltale helps reduces the combinatorial explosion. The construction of trees using telltales in pairs helps identify hidden dependencies, reducing options still further. Nevertheless, it may be impractical to conduct an exhaustive search of all remaining combinations. Instead, judgment and parsimony are required in settling on a "final" tree to carry forward to the next step in the process.

There are two distinct outputs of the decision tree building step. First, one has the set of self-similar-risk groups. Because the charge-off/cure result for each was "carried along for the ride," one can assign a probability of charge-off to each group. One can also "carry along" information about the amount of the charge-off, the amount of the recovery and the split of each into principal vs. fees. Based on this information one can determine the expected values for un-recovered principal and fee charge-offs.

Second, one has the tree itself. The tree is a well defined algorithm for partitioning cases histories into self-similar risk groups. As such, it can be used to partition future case histories into those same risk groups. Once appropriate treatments are determined for each risk group, future case histories can be assigned those treatments based on the risk group they are partitioned into.

Treatment Optimization and Limits

Having partitioned case histories into risk groups, the next step is to seek the "best" treatment for each. Treatment optimization is driven by profit and customer service concerns. Where it is profitable to authorize and/or pay an item into overdraft, the service to the customer should be offered. Where, however, the bank is likely to lose money, then the bank should decline or return the associated transactions.

In one embodiment of the present invention, profit is given by the formula

Profit=Fees generated

−Fees waived

−Fees charged off

+Charged off fees recovered

−Principal charged off

+Charged off principal recovered

+Interchange fees

+Estimated soft profit

−Estimated soft costs where

Fees generated=Fees assessed by the bank in its batch posting process for items that would post into a negative balance if paid (i.e. insufficient funds items).

Fees waived=Fees waived or refunded by the bank.

Fees charged-off=Fees assessed but never collected due to the account charging off with a negative balance.

Charged off fees recovered=Fees charged off but later recovered as part of the bank's or a third party's post-charge-off collection process.

Principal charged off=Principal extended by the bank to cover insufficient funds items and later charged off.

Charged off principal recovered=Principal extended by the bank to cover insufficient funds items, then charged off but later recovered as part of the bank's or a third party's post-charge-off collection process.

Interchange fees=Fees received by the bank for servicing certain types of electronic transaction (e.g. a point of sale check card transaction)

Estimated soft profit=Estimated total profit associated with factors like enhanced customer retention.

Estimated soft cost=Estimated total cost associated with factors like the reduced use of a check card following one or more denials by the bank.

Figure 9:
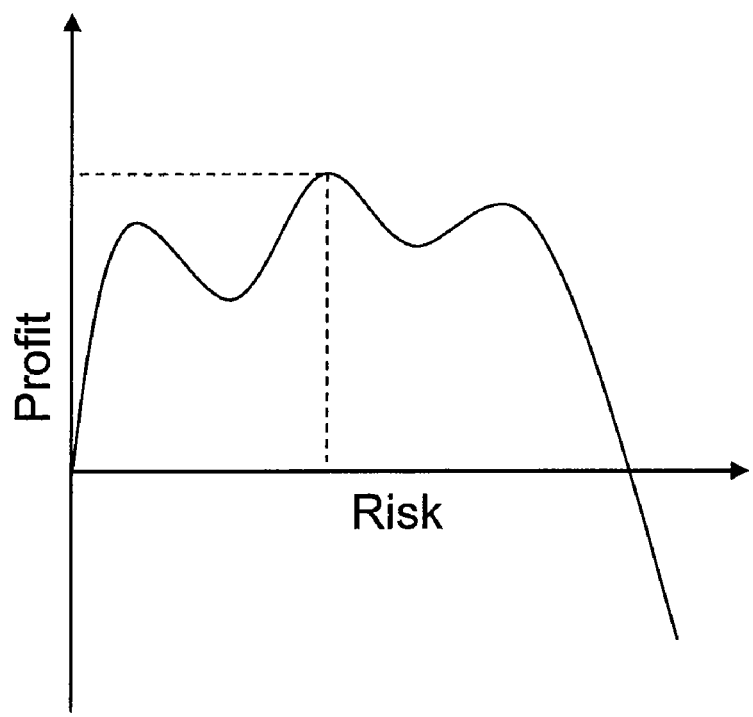
FIG. 9 illustrates a multi-modal profit vs. risk curve.

As with most risk reward situations, if a bank were to forgo all risk, fee generation would fall and profits would be low. Similarly, if a bank were to ignore risk, losses would be high and again profits would be low or even negative. The general situation is indicated in FIG. 9. As one embraces additional risk, in the current case by authorizing and paying more items into an overdraft position, one is rewarded with increasing profits. If all customers behaved in the same way, profit would grow continuously to some maximum and then fall off. As a result of the prior analysis, however, self-similar risk groups which differ in behavior (i.e. their propensity for charge-off) from one group to the next have been identified. Each of these risk groups will have its maximum profit for a different level of risk, leading to a multi-modal profit vs. risk curve. (See again FIG. 9.)

Figure 10:
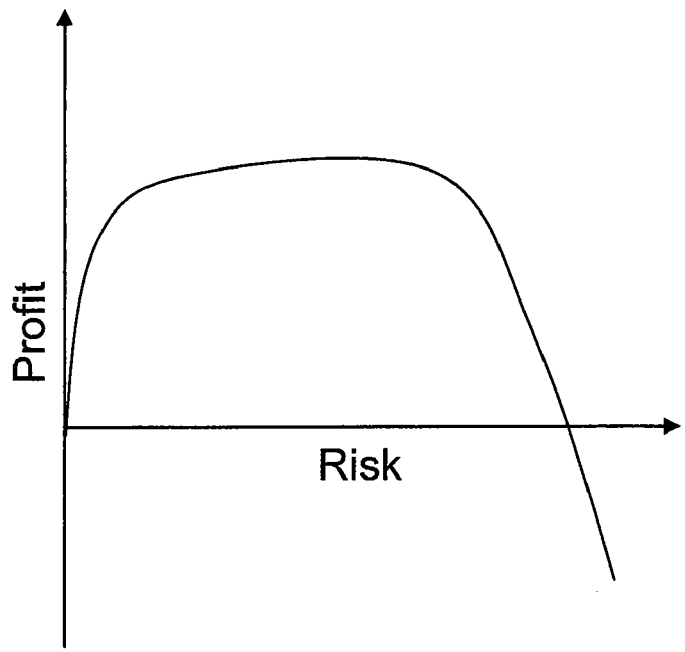
FIG. 10 illustrates a profit vs. risk curve flattening out in a more realistic multi-modal situation.
Figure 11:
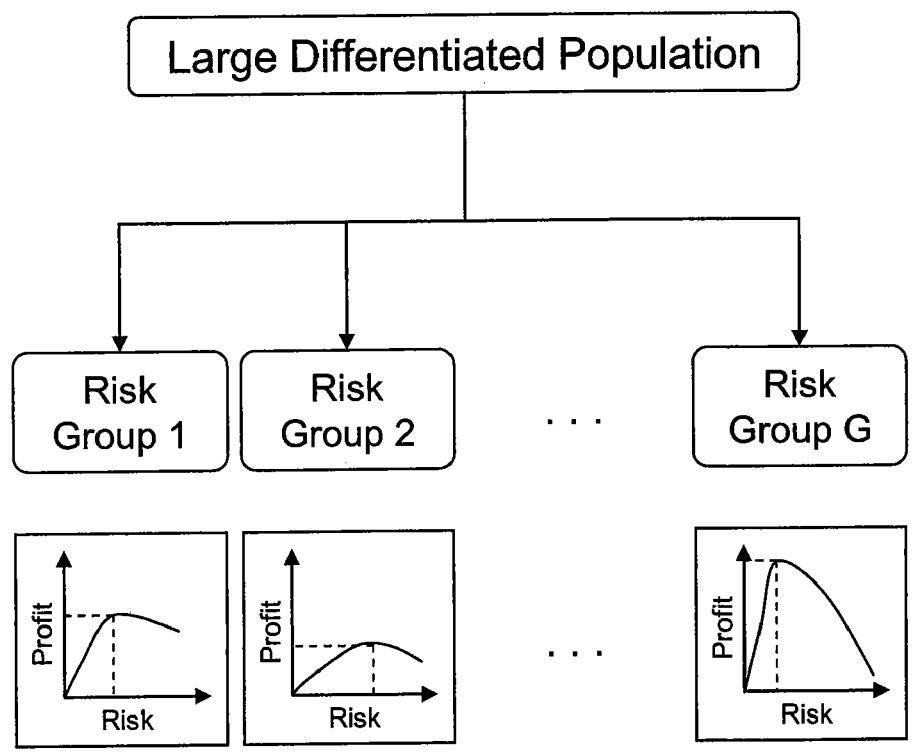
FIG. 11 illustrates the partitioning of large differentiated population into a set of self-similar risk groups, each with a well defined maximum on its profit vs. risk curve.

The number of unique risk groups for decision trees with strong predictive power tends to be 40 or more. Thus, in the combined profit vs. risk curve for an entire population, individual profit maxima tend to merge into a broad plateau masking the existence of individual risk groups. (See FIG. 10.) If, instead, one considers the profit vs. risk curves for each of the individual risk groups, as illustrated in FIG. 11, the individual profit maxima re-emerge although the actual curves may not be as smooth as those shown.

Figure 12:
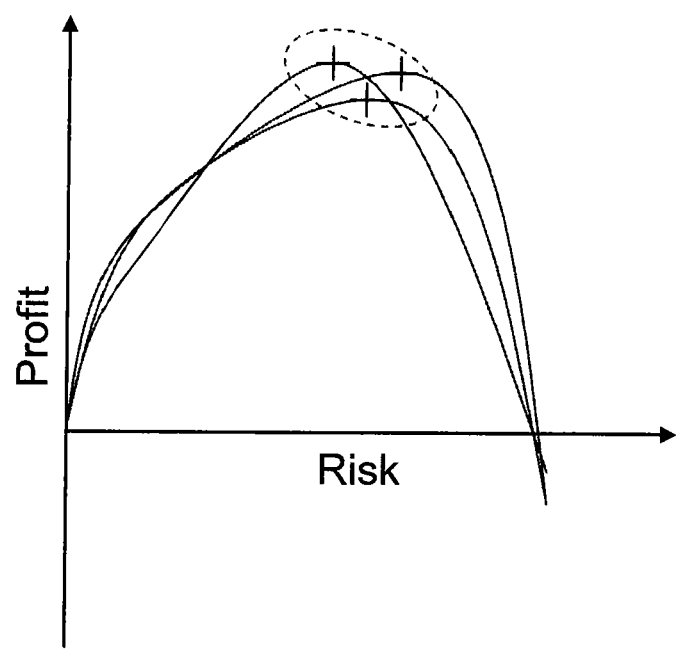
FIG. 12 illustrates changes to a profit vs. risk curve for given risk groups as the composition of case histories occupying that risk group change over time.

Ideally one would like to "park" the risk taken for each risk group at the point of maximum profit. The risk groups defined by a decision tree are not static however. Some telltales change almost daily, but even infrequent changes will lead to a case history moving from one risk group to another with the passage of time. As a result, the precise composition of a risk group will change even though the decision tree rules describing it will not. The effect is for the maxima of the profit vs. risk curves to move about as well. (See FIG. 12.) This affects how the best treatments for each risk group should be determined.

Figure 13:
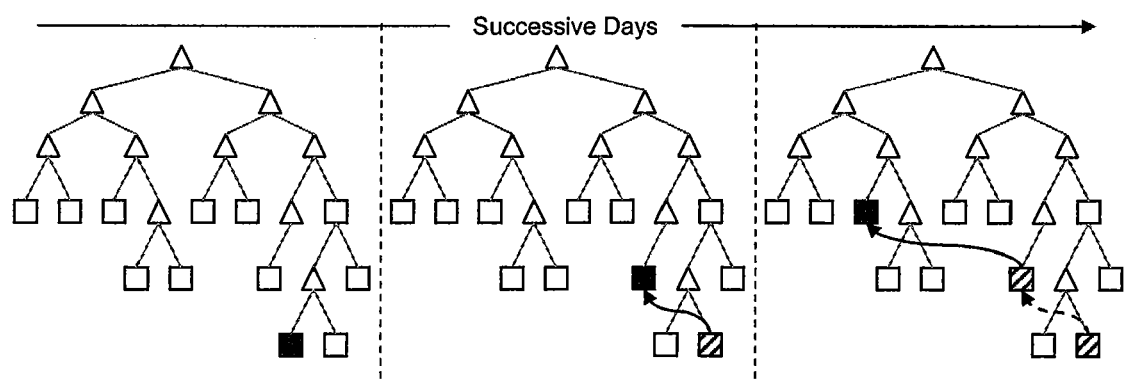
FIG. 13 illustrates the "trajectory" of an account as it moves from one risk node to the next on the basis of changes in its telltale values.

A given case history will move about the decision tree risk groups as its telltale values change. At each "stop", the fees it generates and principal it puts at risk make additive (possibly negative) contributions to the profit history for that account. Since the treatments assigned to each node differ, it is the full set of treatments across the entire tree that define a given profit history. (See FIG. 13).

The treatment for each risk group is comprised of a set of overdraft limits playing slightly different roles. In one embodiment of the present invention there are four such limits.

Batch Limit The limit used to make pay/return decisions in batch posting provided that no deposit has been made since the last batch posting and no notice received of any pending ACH deposits.

Deposit Override Batch Limit: The limit used to make pay/return decisions in batch posting when either a deposit has been made since the last batch posting or notice has been received of a pending ACH deposit.

Authorization Limit: The limit used to make authorization/decline decisions during the day provided that no deposit has been made since the last batch posting and no notice received of any pending ACH deposits.

Deposit Override Authorization Limit: The limit used to make authorization/decline decisions during the day when either deposit has been made since the last batch posting or notice has been received of a pending ACH deposit.

In other embodiments of the present invention, other, fewer or more limits could be used depending on:

the rapidly changing telltales for which one decides to project the risk group to which a case history might move, and, as a result, require a different limit; and the individual debit channels (e.g. checks, tellers, ATM, POS, ACH, etc) for which one decides to offer other than the basic Batch Limit.

Figures 14, 15:
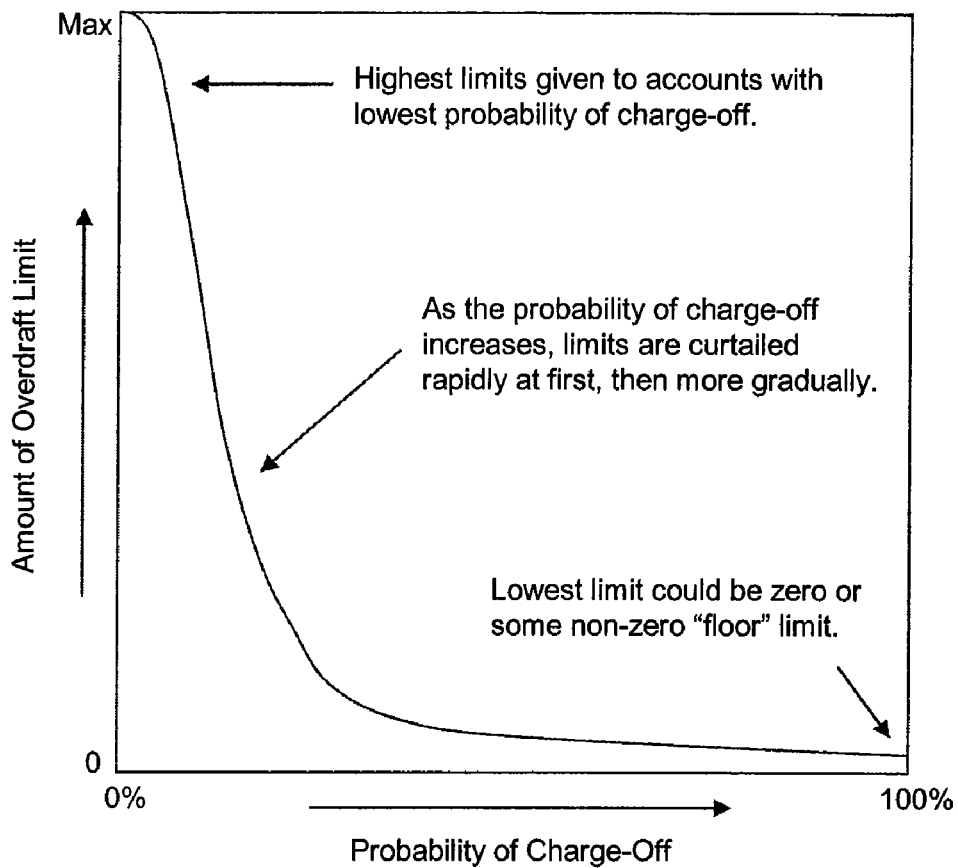
FIG. 14 illustrates one curve from one multi-parameter family of curves that meets the high-level criteria for a family of overdraft-limit vs. probability of charge-off curves.
FIG. 15 illustrates a table used to summarize modeling results for the profit (or loss) made by a bank by offering a given set of limits over a suitable modeling period.

In setting these various limits it is important to keep certain broad rules in mind. These rules are illustrated in FIG. 14.

First, the Batch Limit assigned to a less risky risk group is always greater than or equal to that assigned to a more risky risk group. Second, in assigning Batch Limits, as one moves from the least risky risk groups toward those of greater risk, there will be a point at which the overdraft limit vs. probability of charge-off curve falls off rather rapidly as the risk of charge-off loss overwhelms the possibility of incremental fee revenue. Third, the overdraft limit vs. probability of charge-off curve may either approach zero or tail off to some small non-zero amount where very little principal is put at risk for the opportunity of securing a single fee.

Various multi-parameter families of smooth curves with these properties can be used to generate limits. One embodiment of the present invention uses the 5-parameter family of curves given by the following equation.

$$L=a(e^{(-bp^c)}-e^{(-b)})+c(1-p)+d$$

where

L=The overdraft limit to be assigned to a risk group.

p=The probability of charge-off for that risk group.

a, b, c, d, e=The five parameters governing the detailed shape of the curve.

Other similar equations could be used as well.

The precise shape of the curve giving the limits (of a given type: Batch, Authorization, etc.) as a function of the probability of charge-off are determined through a multi-step modeling procedure.

A suitable modeling period is chosen. Eventually modeling results will be normalized to yield annual values. In one embodiment of the present invention, a single calendar month is used.

The results of using a test limit of zero dollars for each risk group are modeled for the month.

The Profit Formula is used to determine the profit (or loss) at that limit for each risk group on each day of the modeling period The total profit (or loss) for each risk group is obtained by summing the individual daily results.

The process is repeated with a new test limit. It is helpful to examine fairly closely spaced test limits near zero and more widely spaced test limits as one works toward a suitable maximum. In one embodiment of the present invention, test-limit increments of 5 dollars are used at first and then gradually increased to increments of 500 dollars up to a maximum of 5000 dollars.

The results of this iterative modeling process are assembled into a Profit Grid, an example of which is shown in FIG. 15.

For any given Profit Grid and any given multi-parameter set of curves, standard regression techniques are used to find the parameter settings resulting in the maximum total profit for all risk groups. In one embodiment of the present invention, Excel's Solver feature performs this function.

The models in this procedure examine the what-if profit (or loss) of re-authorizing or re-positing transactions at the current test limit instead of at the limit the account actually had on that day. Because customers will behave differently as they are treated differently, one cannot assume that the effects of one day can be carried forward to the next over an extended period of time. In one embodiment of the present invention, no effects are carried forward with each positing day being modeled as a simple change from the way that day had originally posted at the bank. In other embodiments, differences could be allowed to accumulate over a period of days before being discarded. Thus for example, Wednesday's model might include balance difference resulting from modeled activity on Monday and Tuesday. In this 2-day cumulative approach, Thursday's model includes balance differences resulting from Tuesday and Wednesday, but not from Monday.

As a result of the methodology and processes describe above, limits can be assigned that vary with probability of charge-off, meet the general criteria highlighted in FIG. 14 and maximize profit over an extended period long enough to be realistically normalized to a year.

Tuning

The limits assigned by the methodology describe above will grant "safe" case histories higher limits and risky case histories lower or even zero limits. Changing the limits offered to an account as its case history evolves, will induce further change in the way the account holder manages that account. Thus, however well a given decision tree recognizes and partitions out the unique self-similar risk-groups, the effects of using that tree to assign future limits will induce changes in customer behavior that over time erode the predictive accuracy of the tree. For this reason, some form of tracking and tuning are necessary to insure ongoing fidelity.

Tracking and tuning are important for other reasons as well. Each year the fraction of debit transactions conducted electronically increases. Many of these are ATM or POS transactions. If declined, an ATM or POS transaction generates no revenue, not even Interchange Fees. By contrast, a returned check generates a returned item fee that is, in most cases, the exact same size as a paid overdraft fee. So future payment migration will further alter the revenue framework, detuning any purely static limit system.

Two other factors to consider are the joint influences of competition from non-bank financial service providers and of product reforms aimed at expanding and/or reclaiming market share. These factors introduce additional dynamic elements that will render at least some current assumptions invalid in the future.

The tracking and tuning elements of the present methodology provide a way to respond to the aforementioned challenges, while at the same time providing a way to "turn on" the methodology at a bank that is either unable or chooses not to initiate a study of the type described earlier. (See "Collecting Data and Assembling Case Histories") Indeed, since the study approach leads to considerable delay in implementation, the preferred approach would be to forego a study and "turn on" the methodology as described herein.

In one embodiment of the present invention, a software system, interfaced with the bank's systems, collects the raw data elements needed to compute values for the set of individual telltales determined to be the most powerful predictors of charge-off and cure. That same system also:

Runs case histories through the then current decision tree, thereby determining their probability of charge-off;

calculates from the probability of charge-off, the overdraft limit(s) to be assigned to the case history. (See "Treatment Optimization and Limits");

collects and assembles tracking information on the limits used, the fees generated and the charge-offs incurred; and analyzes these results in view of the decision tree behind the limits, the individual telltales used in that tree, and other individual telltales available at the time but not used by the tree.

Referring again to FIG. 16, a software system for implementing the methodology of the present invention includes one set of components running locally at each bank using the system and another set of components running at a central location. The components running locally at each installed bank house the logic and data needed to assign overdraft limits for that bank's account base; the central components house the logic and data to perform regular, ongoing performance tuning for all individual bank installations (see FIG. 17).

Figure 16:
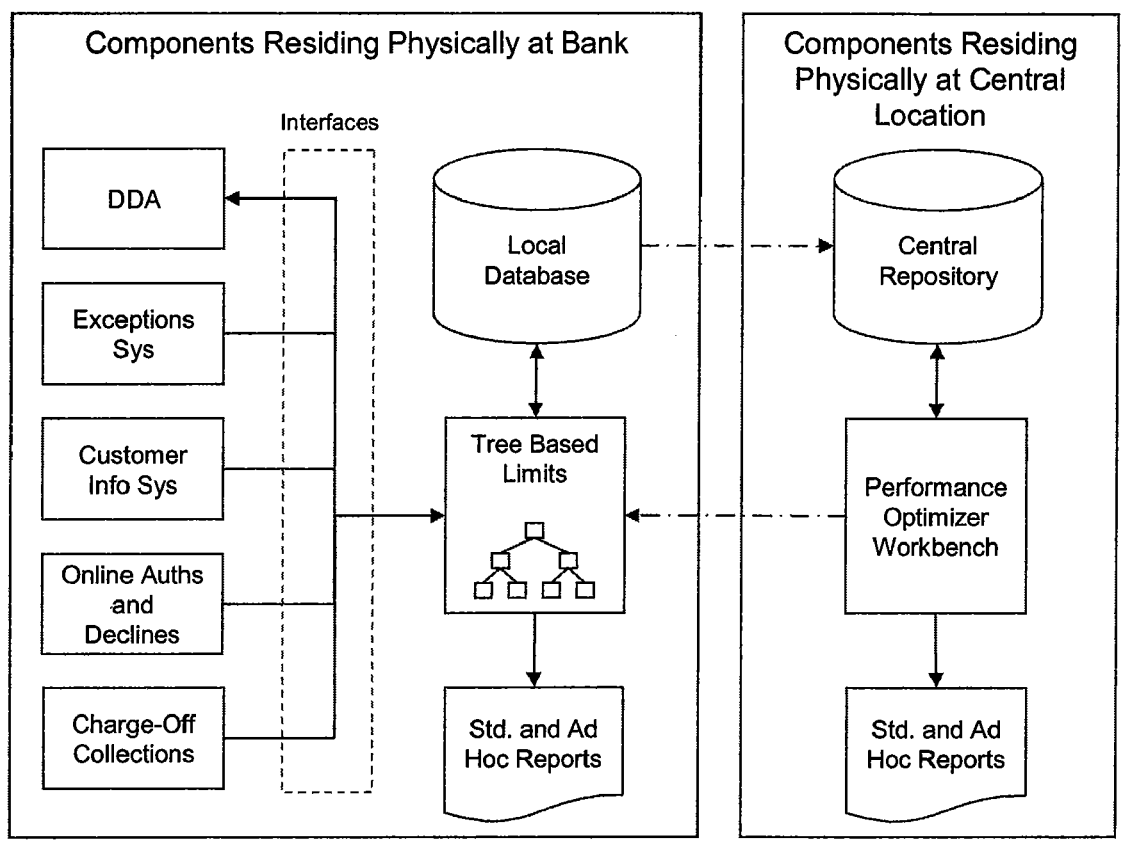
FIG. 16 illustrates a bank (local) and central components of a system for practicing the method of the present invention.
Figure 17:
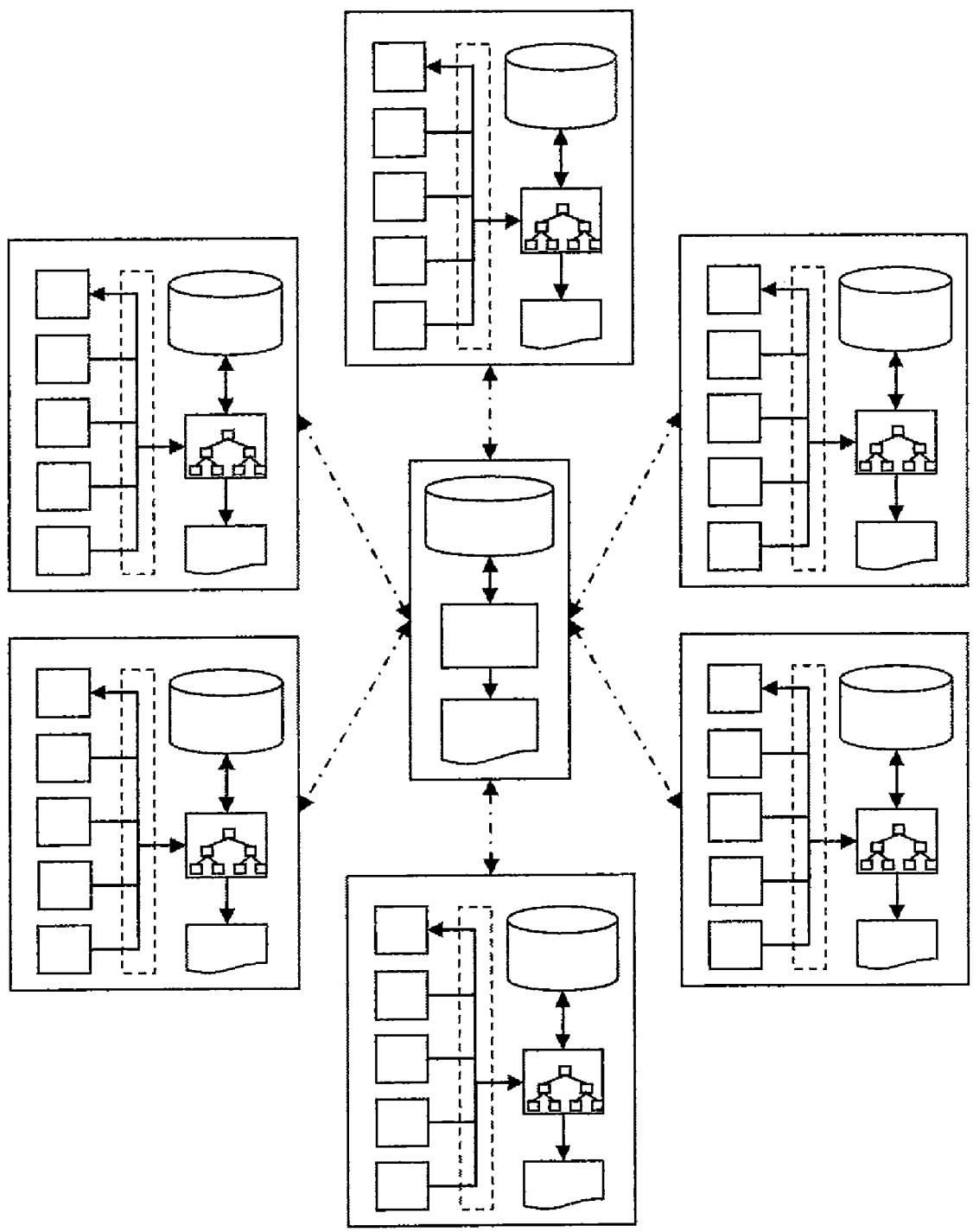
FIG. 17 illustrates a central (hub) component of a system servicing multiple individual bank-local (spokes) components.

The process begins as shown in FIG. 16, with data being extracted from five major systems in the bank.

TABLE 1

| Bank Source System | Information to be Acquired |
| --- | --- |
| DDA (Demand Deposit Account System) | Account, transaction, day-1 exception handling, balances, overdraft limits. |
| Exceptions System | Day-2 exception handling. |
| Customer Information System | Customer information, relationship information. |
| Online Authorization System | Authorizations, denials, overdraft limits, intra-day memo-posted items. |
| Charge-Off Collection System | Charge-offs, recoveries. |

These systems are fairly standard across a wide spectrum of banks, although the actual names for these systems used within a given bank vary. Often, the interface information required is replicated by the bank in more than one system, and some systems may be easier or more economical to extract from. Thus, in some cases, additional data sources, beyond those listed in Table 1, may be required. In other cases, one Bank Source System may be omitted because the data required from it is replicated in other systems on the list.

Banks implementing the system are provided with specifications describing how each of several interface files are to be prepared prior to being passed to Local Limit System (see FIG. 16). These specifications define the content, format, file naming conventions, update rules, and update frequency for each such interface file. The specifications also provide for the option of dividing all case history information by "regions." These "regions" should not be thought of as necessarily geographical regions, but instead as any grouping of case histories into subsets convenient for the bank to process separately.

In order for information from different interface files to be combined so as to either create or extend a case history, all the information about a given case history needs to share some unique key. The account number (possibly in combination with a bank or organization number) is the natural key for such a purpose, but has the disadvantage of exposing potential identify theft information (the account number itself) to the Local Limit System and Central Performance Optimizer. In contrast, there is no risk of identify theft associated with the other extract fields, even though these fields contain the critical information needed to predict charge-off prediction and tune performance.

Figure 18:
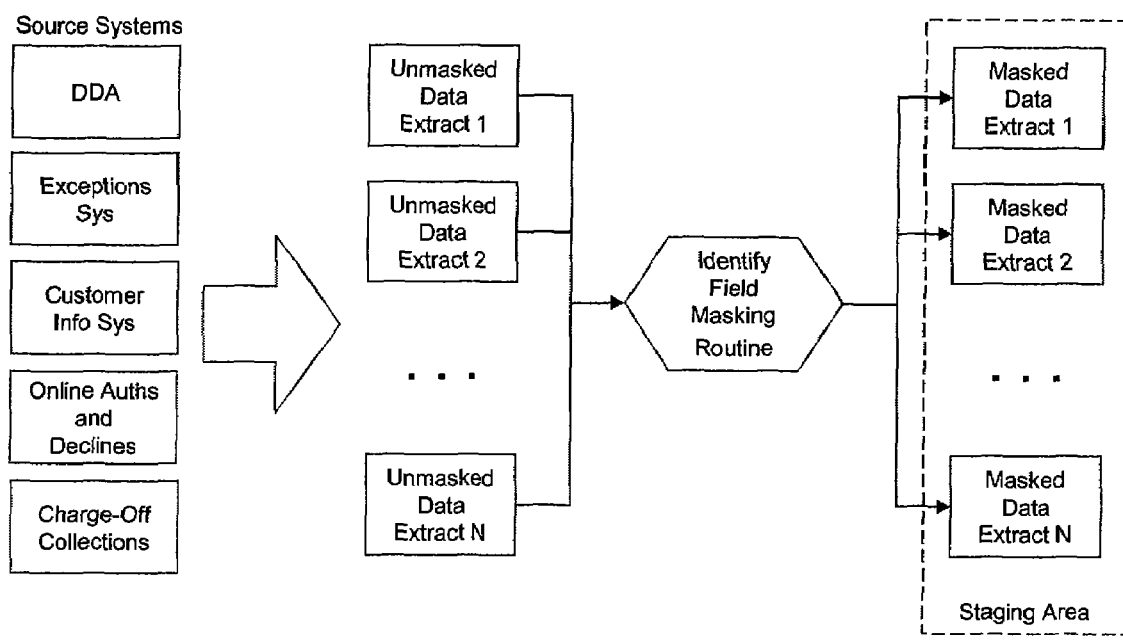
FIG. 18 illustrates extract files prepared by a bank.

Consequently, it adds a useful layer of security to "mask" account numbers (or the combination of bank number or organization number along with account number) prior to sharing the prepared extract files with the Local Limit System and eventually the Central Performance Optimizer. This process is illustrated in FIG. 18. Because the bank controls the encryption keys used to "mask" account numbers, only they are in a position to "unmask" them. Unmasking is, indeed, an important requirement in support of limit assignment and problem resolution.

It will be recalled that the present invention assigns one or more overdraft limits to each case history. (See Treatment Optimization and Limits.) These limits are passed back from the Local Limit System to the bank using the masked account numbers as identifiers. To make use of these limits in updating their own systems, the bank must unmask the account numbers.

Similarly, any installation of a new methodology or system normally involves a testing period. During such testing periods, one often encounters apparent data anomalies that must be traced back to spruce systems involved. Even when a methodology or system has been in place for some time, there is still the need for a trace-back method, should unanticipated data values Yes materialize. In the current case, in order to trace back one or more case histories, the data in question must be sent back to the bank still keyed by the masked account numbers the bank assigned prior forwarding the raw data on the Local Limit System. In order to research this case history data on their own systems, the bank must first unmasked the account numbers for each.

Returning now to the extract files shown in FIG. 18, after identity field masking these files would be placed in a designated staging area on the bank's secure storage. This area would have previously been made accessible to the Local Limit System. At this point, one of two things would happen:

The bank process responsible for moving the files to the staging area would message the Local Limit System (see FIG. 16) notifying it that new extracts were available for import; or the Local Limit System would have been previously configured to look periodically (poll) for new files in the staging area and begin import processing whenever they were detected.

Regardless of whether the Local Limit System becomes aware of new extract files via messaging or polling, the next step is to import all available files. Import processing performs various validity checks on the data, updates case history information in the Local Database attached to the Local Limit System (see FIG. 16), and copies each processed extract to another location to preserve the file, should it be needed further, while preventing redundant processing.

Telltale Computation

Once the Local Database (see FIG. 16) has been updated with any additions or changes to the case histories, individual telltale calculation can begin. As explained earlier (see Determining the Most Promising Representation of Each Conceptual Telltale), any given conceptual telltale may have one or more representations. Many of these representations follow similar calculation rules. For example, one frequently repeated rule can be codified in a template of the form:

Count the total number of transactions of type _ that have occurred in the last _ calendar days.

In the preferred embodiment, each representation of each conceptual telltale to be refreshed across the case histories is listed in a table that indicates the specific imported data and calculation template to use. Working through this table for each case history completes the process of refreshing all telltales. From time to time, table entries may be added, adding a new individual telltale, or marked as disabled, indicating that a given individual telltale will no longer be refreshed (for now).

Limit Assignment

At implementation, each bank adopting the preferred embodiment will be assigned an initial decision tree for partitioning their case histories into risk groups. This decision tree will be based on what is known about effective trees previously or currently in use at other institutions that have adopted the system and information gathered during the implementation planning process. This initial tree will be known to partition case histories into risk groups with certain probabilities of charge-off.

Similarly, based on what is known about effective limit setting functions (see Treatment Optimization and Limits) at other institutions that have adopted the system and information gathered during the implementation planning process, an initial set of limit functions will be assigned. These limit functions assign limits of various types (see the discussion about multiple limits in Treatment Optimization and Limits) to case histories based on their probability of charge-off. Thus, as each case history is passed through the decision tree the result is a risk group with a probability of charge-off and therefore a set of limits.

Both the initial decision tree and the initial set of limit functions should be regarded as provisional in the following sense: While they serve as conservative starting points, as yet, they do not fully take all bank specific information into account and are, therefore, not fully optimized. We will return to how the preferred embodiment incorporates bank specific information into trees and limit functions in a later section.

Local Reports

In order to monitor day-to-day operation, track long term performance, and take advantage of the unique, case history database assembled by the preferred embodiment, it will offer a selection of standard reports and an ad hoc reporting facility. Standard reports may be set to run automatically, on an appropriate schedule, or on an as needed basis. All reports may be either printed or distributed electronically using the preferred electronic distribution channel of the bank.

Local reports would have access to all the balance, transaction, exception, account, customer and relationship information received from the bank. Local reports would also have access to the limits sent back to the bank and statistical summary information on the effectiveness of those limits in providing customer service, in generating fees and in controlling charge-offs. Other information, like the logic structure of the current tree, the set of telltales it relies on, the calculation of those telltales and the limit functions in use might not be available to the users of the Local Limit System.

Upload to Central Performance Optimizer

Periodically, the data accumulated in the Local Database by the Local Limit System would be uploaded to the Central Performance Optimizer and stored in its database, the Central Repository. (See FIG. 16.) Data would be encrypted and transmitted over a secure FTP link, then decrypted for update into the Central Repository. The upload frequency could be as often as once a day or as infrequently as once a month or less, depending on the amounts of data accumulated at a given size bank and the FTP bandwidth available. Other methods of encryption and transmission would be available in other embodiments.

Note that the decryption referred to in the last paragraph, does not expose privacy information. Account numbers (and any other privacy fields used) are already masked in the extracts forwarded by the bank to the Local Limit System. Only masked values are imported into the Local Database. These masked numbers are then encrypted once again for transmission to the Central Performance Optimizer. The decryption that follows transmission, returns account numbers (and any other privacy fields) to their masked values. Thus identity information is still protected.

Performance Optimizing

As discussed earlier (see Collecting Data and Assembling Case Histories), one approach to implementing the methodology employed in the invention is to conduct an up-front study. Such a study would collect information, retained by the bank to establish case histories tracing sufficiently far back in time as to allow for the calculation of those historical telltales based on days and/or months of history. For many banks, this approach is impractical. Even when it is practical, collecting and manipulating the data could lead to implementation delays.

The preferred embodiment relies instead on forward data collection. When the system is "turned on" the bank sends extract files initializing the case histories to be tracked and awarded limits by the system. However as much historical information as is available should be included in these extracts. Typically this will be enough to create some historical telltales but not those that span a longer period, ruling out these other telltales for immediate use. After the required longer period of time, these other telltales become eligible for inclusion in decision trees.

It will also be typical for a bank to include in its extracts certain information unique to that institution. For example, a bank might include its own numeric or categorical customer profitability score. In order to determine the predictive value of bank unique information, accounts with differing values must be watched over a period of time to see which overdraft and later cure, and which overdraft and later charge off. After a suitable period has elapsed, the stand-alone predictive value of such bank-specific telltales can be assessed via the techniques described in Determining the Most Promising Representation of Each Conceptual Telltale and the power of such individual telltales to work in concert with others analyzed by testing new decision trees.

Thus some telltales must first "ripen" before enough is known about them to use them in the case history partitioning process. As they do ripen, the potential exists to take advantage of what they convey about a given case history and improve to overall prediction of charge-off and cure. This is one of three ways in which the Central Performance Optimizer acts to tune performance.

The second concerns changes in the bank's product mix, account base, geographic footprint, transaction mix and operational procedures, all of which normally evolve slowly over time and any of which may change suddenly with the introduction of a major bank initiative. Such changes can render previously powerful telltales less so. Conversely, such changes can increase the predictive power of a telltale that had not seemed promising earlier.

The third way in which the Central Performance Optimizer acts to tune performance arises because, in principle, one could define an infinite number of telltales based on the data being collected. In the end, those actually created and tested are a matter of human ingenuity and business sense. Because the Central Repository brings together similar information from many banks and because it houses interesting bank unique data items as well, it provides a workbench where human creativity and business sense can be applied in the search for new predictors of charge-off and cure.

In summary, therefore, the Central Performance Optimizer provides the following telltale and decision tree capabilities:

test new trees based on telltales as they "ripen" following implementation;

test new combinations of telltales in new trees as changes in the bank de-optimize the current set; and provide a research platform for the search for even better ways of turning raw extract information into predictive telltales and trees.

The Central Performance Optimizer also supports limit function tuning. Recall that limit functions map the probability of charge-off associated with a risk group into one or a set of overdraft limits that constitute the treatment for that risk group. (See Treatment Optimization and Limits.) The extent to which these functions optimize the profitability of the ensemble of case histories being tracked and managed by the Local Limit System will change over time with other natural changes as discussed earlier: namely, either evolutionary or sudden changes to product mix, account base, geographic footprint, transaction mix or operational procedures.

The Central Performance Optimizer, in the preferred embodiment at least, is a combination of software routines to seek improved telltales, trees and limit functions along with a set of tools allowing subject-matter experts to take that same process even further.

One way the Central Performance Optimizer will seek improved telltales is to examine all meaningful combinations of values that can be plugged into each of the calculation templates in the system. Consider, for example, the calculation template discussed in the section on Telltale Computation.

Count the total number of transactions of type _ that have occurred in the last _ calendar days.

One transaction type and conceptual telltale of interest that relies on this template is the number of customer initiated debits in the N most recent days. The Central Performance Optimizer would seek the "best" individual representation of this conceptual telltale by trying all values of N from 1 to the maximum numbers of days available in the raw data history provided in a given bank's extract files. The ROC lift for each value of N would be calculated, compared and plotted. (See FIG. 6, ROC Curves and Lift and the section titled Determining the Most Promising Representation of Each Conceptual Telltale.) Such analysis might show that the ROC lift vs. the number of calendar days counted peaks at a single value or has multiple peaks. The former case would lead to a single telltale with the value of N giving the maximum lift; the latter case would lead to multiple telltales.

Similarly, within the Central Performance Optimizer the decision tree building software would be programmed to look at all possible trees meeting certain reasonability constraints. Because the number of possible trees based on T individual telltales chosen from M available telltales grows rapidly (on the order of $M^T$), reasonability constraints are needed to ensure that the Central Performance Optimizer completes this analysis in a reasonable amount of time.

Once the automated routines of the Central Performance Optimizer (and/or subject-matter experts using the data in the Central Repository and the tools supplied by the Central Performance Optimizer) have found an enhanced configuration of telltales, decision tree and limit functions, a "package" with the code and table modifications needed to effect those enhancements is prepared for download to the bank.

Enhancement Packages

Packaged enhancements are encrypted by the Central Performance Optimizer, downloaded to the receiving bank over secure FTP, unencrypted by the Local Limit System at that bank and stored. Each time a new enhancement package is forwarded to a bank's Local Limit System, the designated system administrator for that system is notified and provided with a brief description of high-level contents of the package, the reasons for its being sent and the differences it should make.

The code and table modifications included in the package remain idle until the system administrator turns them on in "test mode." In test mode the new code and tables are run against a suitable sample of the bank's case histories side-by-side with the existing code and tables currently in use at that ban. Various test results are made available via screens and reports. Based on these outputs, the system administrator for the Local Limit System may choose to activate the new code and tables, or leave them idle pending further testing and inquiry.

I claim:

1. A computer-implemented method, comprising:

clustering, by a financial computing system, a plurality of financial accounts into a first risk group comprising a first subset of the plurality of financial accounts and a second risk group comprising a second subset of the plurality of financial accounts, wherein the first risk group is clustered based on a first probability of at least one of overdraft charge-off or overdraft curing and the second risk group is clustered based on a second probability of at least one of overdraft charge-off or overdraft curing;

determining, by the financial computing system, a first value for a type of overdraft limit, associated with a type of overdraft, for the first risk group and a second value for the type of overdraft limit for the second risk group, wherein the first value optimizes an expected profit for the first risk group for the type of overdraft at a first risk level and the second value optimizes an expected profit for the second risk group for the type of overdraft at a second risk level; and assigning, by the financial computing system, the first value for the type of overdraft limit to each of the financial accounts in the first risk group and the second value for the type of overdraft limit to each of the financial accounts in the second risk group.

2. The computer-implemented method of claim 1, wherein the first probability is less than the second probability, and the first value is greater than second value.

3. The computer-implemented method of claim 1, wherein the first risk level is different than the second risk level.

4. The computer-implemented method of claim 1, wherein the type of overdraft limit comprises one of (i) a batch limit, (ii) a deposit override batch limit, (iii) an authorization limit, or (iv) a deposit override authorization limit.

5. The computer-implemented method of claim 1, wherein the type of overdraft limit is for one of (i) a check, (ii) a teller transaction, (iii) an automated teller transaction, (iv) a point of sale transaction, or (v) an automated clearing house transaction.

6. The computer-implemented method of claim 1, wherein each of the expected profit for the first risk group and the expected profit for the second risk group is determined based at least in part on revenues and costs for the type of overdraft limit.

7. The computer-implemented method of claim 1, wherein determining the first value and the second value for the type of overdraft limit for the first risk group and the second risk group comprises:
iteratively evaluating profit for the first risk group using a first plurality of test limits in a first profit formula;
iteratively evaluating profit for the second risk group using a second plurality of test limits in a second profit formula;
determining that profit for the first risk group is maximized with one of the first plurality of test limits having the first value; and
determining that profit for the second risk group is maximized with one of the second plurality of test limits having the second value.

8. The computer-implemented method of claim 1, wherein the type of overdraft limit is a first type of overdraft limit, and wherein the type of overdraft is a first type of overdraft, and further comprising:
determining, by the financial computing system, a third value for a second type of overdraft limit, associated with a second type of overdraft, for the first risk group and a fourth value for the second type of overdraft limit for the second risk group, wherein the third value optimizes the expected profit for the first risk for the second type of overdraft as a function of the first risk, and wherein the fourth value optimizes the expected profit for the second risk group for the second type of overdraft as a function of the second risk; and
assigning, by the financial computing system, the third value to each of the financial accounts in the first risk group and the fourth value to each of the financial accounts in the second risk group.

9. The computer-implemented method of claim 1, further comprising:
collecting case history data for the plurality of financial accounts;
identifying, by the financial computing system, at least one element of the case history data that has value in predicting the probability of overdraft charge-off or overdraft curing; and
generating, by the financial computing system, for each of the plurality of financial accounts, at least one information representation, wherein each information representation is associated with at least one of the identified elements of the case history data,
wherein clustering the plurality of financial accounts into the first risk group and the second risk group is based at least in part on the at least one information representation generated for each of the plurality of financial accounts.

10. The computer-implemented method of claim 9, wherein the case history data comprises at least one of the categories of (i) account information, (ii) customer information, (iii) relationship information, (iv) balance information, (v) transactions, or (vi) exceptions.

11. The computer-implemented method of claim 9, wherein the at least one information representation is either (i) numerical or (ii) categorical.

12. The computer-implemented method of claim 9, wherein the at least one element of the case history data comprises a plurality of elements of the case history data, wherein the at least one information representation is associated with at least two of the plurality of elements of the case history data.

13. The computer-implemented method of claim 12, wherein the at least two of the plurality of elements of the case history of data when used together have a greater value in predicting the probability of overdraft charge-off or overdraft curing than each of the at least two of the plurality of elements of the case history of data used independently.

14. The computer-implemented method of claim 12, wherein identifying at least one element of the case history data comprises identifying a plurality of elements of the case history data, wherein each of the at least two of the plurality of elements of the case history data is associated with a different category of the case history data.

15. The computer-implemented method of claim 9, further comprising determining, by financial computing system, one of the at least one information representation as the best for predicting the probability of overdraft charge-off or overdraft curing.

16. The computer-implemented method of claim 15, wherein determining one of the at least one information representation as the best for predicting the probability of overdraft charge-off or overdraft curing is based at least in part on analysis of one of (i) averages or (ii) Receiver Operating Statistics curves and associated lifts for at least one subset of the case history data.

17. The computer-implemented method of claim 9, further comprising:
reassigning, by the financial computing system, a first account in the first risk group to the second risk group, based at least in part on the value of one of the at least one information representation associated with the first account changing with passage of time; and
assigning, by the financial computing system, the second value for the type of overdraft limit to the first account.

18. The computer-implemented method of claim 1, wherein clustering the plurality of financial accounts into the first risk group and the second risk group comprises generating a decision tree.

19. The computer-implemented method of claim 18, wherein generating the decision tree further comprises:
selecting, for at least one node in the decision tree, a best element from case history data for the plurality of financial accounts for effectively clustering the plurality of financial accounts; and
selecting, for the at least one node in the decision tree, a best splitting value associated with the best element for effectively clustering the plurality of financial accounts.

20. The method of claim 19, wherein generating the decision tree further comprises determining that the decision tree comprises sufficient splitting for effectively clustering the plurality of financial accounts.

21. The computer-implemented method of claim 18, further comprising:
receiving, by the financial computing system, a new financial account not in the plurality of financial accounts;
processing, by the financial computing system, the new financial account against the decision tree to determine that the new financial account is to be placed into the first risk group; and
assigning, by the financial computing system, the first value for the type of overdraft limit to the new financial account.

22. The computer-implemented method of claim 18, further comprising tuning the decision tree by the financial computing system, based at least in part on additional data associated with the plurality of financial accounts.

23. The computer-implemented method of claim 22, wherein the additional data comprises at least one of (i) limits used, (ii) fees generated, or (iii) charge-offs incurred.

24. The computer-implemented method of claim 22, further comprising obtaining, by the financial computing system, the additional data from at least one of (i) a Demand Deposit Account System, (ii) an Exceptions System, (iii) a Customer Information System, (iv) an Online Authorization System, and (v) a Charge-Off Collection System.

25. The computer-implemented method of claim 1, further comprising adjusting, by the financial computing system, at least one of the first value for the type of overdraft limit for the first risk group or the second value for the type of overdraft limit for the second risk group based at least in part on at least one of: a change in bank offerings, a change in the accounts comprising the first risk group or the second risk group, a change in bank procedures, or a change in bank policy.

26. A system, comprising:
a memory comprising computer-executable instructions; and
a processor in communication with the memory and operable to execute the computer-executable instructions to:
cluster a plurality of financial accounts into a first risk group comprising a first subset of the plurality of financial accounts and a second risk group comprising a second subset of the plurality of financial accounts, wherein the first risk group is based on a first probability of at least one of overdraft charge-off or overdraft curing and the second risk group is based on a second probability of at least one of overdraft charge-off or overdraft curing;
determine a first value for a type of overdraft limit, associated with a type of overdraft, for the first risk group and a second value for the type of overdraft limit for the second risk group, wherein the first value optimizes an expected profit for the first risk group for the type of overdraft at a first risk level and the second value optimizes an expected profit for the second risk group for the type of overdraft at a second risk level; and
assign the first value for the type of overdraft limit to each of the financial accounts in the first risk group and the second value for the type of overdraft limit to each of the financial accounts in the second risk group.

27. The system of claim 26, wherein the first probability is less than the second probability, and the first value is greater than second value.

28. The system of claim 26, wherein the first risk level is different than the second risk level.

29. The system of claim 26, wherein the type of overdraft limit comprises one of (i) a batch limit, (ii) a deposit override batch limit, (iii) an authorization limit, or (iv) a deposit override authorization limit.

30. The system of claim 26, wherein the type of overdraft limit is for one of (i) a check, (ii) a teller transaction, (iii) an automated teller transaction, (iv) a point of sale transaction, or (v) an automated clearing house transaction.

31. The system of claim 26, wherein each of the expected profit for the first risk group and the expected profit for the second risk group is determined based at least in part on revenues and costs for the type of overdraft limit.

32. The system of claim 26, wherein, when determining the first value and the second value for the type of overdraft limit for the first risk group and the second risk group, the processor is further operable to execute the computer-executable instructions to:
iteratively evaluate profit for the first risk group using a first plurality of test limits in a first profit formula;
iteratively evaluate profit for the second risk group using a second plurality of test limits in a second profit formula;
determine that profit for the first risk group is maximized with one of the first plurality of test limits having the first value; and
determine that profit for the second risk group is maximized with one of the second plurality of test limits having the second value.

33. The system of claim 26, wherein the type of overdraft limit is a first type of overdraft limit, wherein the type of overdraft is a first type of overdraft, and wherein the processor is further operable to execute the computer-executable instructions to:
determine a third value for a second type of overdraft limit, associated with a second type of overdraft, for the first risk group and a fourth value for the second type of overdraft limit for the second risk group, wherein the third value optimizes the expected profit for the first risk for the second type of overdraft as a function of the first risk, and wherein the fourth value optimizes the expected profit for the second risk group for the second type of overdraft as a function of the second risk; and
assign the third value to each of the financial accounts in the first risk group and the fourth value to each of the financial accounts in the second risk group.

34. The system of claim 26, wherein the processor is further operable to execute the computer-executable instructions to:
collect case history data for the plurality of financial accounts;
identify at least one element of the case history data that has value in predicting the probability of overdraft charge-off or overdraft curing; and
generate for each of the plurality of financial accounts, at least one information representation, wherein each information representation is associated with at least one of the identified elements of the case history data,
wherein the plurality of financial accounts are clustered into the first risk group and the second risk group based at least in part on the at least one information representation generated for each of the plurality of financial accounts.

35. The system of claim 34, wherein the case history data comprises at least one of the categories of (i) account information, (ii) customer information, (iii) relationship information, (iv) balance information, (v) transactions, or (vi) exceptions.

36. The system of claim 34, wherein the at least one information representation is either (i) numerical or (ii) categorical.

37. The system of claim 34, wherein the at least one element of the case history data comprises a plurality of elements of the case history data, wherein the at least one information representation is associated with at least two of the plurality of elements of the case history data.

38. The system of claim 37, wherein the at least two of the plurality of elements of the case history of data when used together have a greater value in predicting the probability of overdraft charge-off or overdraft curing than each of the at least two of the plurality of elements of the case history of data used independently.

39. The system of claim 37, wherein, when identifying at least one element of the case history data, the processor is operable to execute the computer-executable instructions to identify a plurality of elements of the case history data, wherein each of the at least two of the plurality of elements of the case history data is associated with a different category of the case history data.

40. The system of claim 34, wherein the processor is further operable to execute the computer-executable instructions to determine one of the at least one information representation as the best for predicting the probability of overdraft charge-off or overdraft curing.

41. The system of claim 40, wherein the processor is operable to execute the computer-executable instructions to determine one of the at least one information representation as the best for predicting the probability of overdraft charge-off or overdraft curing based at least in part on analysis of one of (i) averages or (ii) Receiver Operating Statistics curves and associated lifts for at least one subset of the case history data.

42. The system of claim 34, wherein the processor is further operable to execute the computer-executable instructions to:
reassign a first account in the first risk group to the second risk group, based at least in part on the value of one of the at least one information representation associated with the first account changing with passage of time; and
assign the second value for the type of overdraft limit to the first account.

43. The system of claim 26, wherein, when clustering the plurality of financial accounts into the first risk group and the second risk group, the processor is further operable to execute the computer-executable instructions to generate a decision tree.

44. The system of claim 43, wherein, when generating the decision tree, the processor is further operable to execute the computer-executable instructions to:
select, for at least one node in the decision tree, a best element from case history data for the plurality of financial accounts for effectively clustering the plurality of financial accounts; and
select, for the at least one node in the decision tree, a best splitting value associated with the best element for effectively clustering the plurality of financial accounts.

45. The system of claim 44, wherein, when generating the decision tree, the processor is further operable to execute the computer-executable instructions to determine that the decision tree comprises sufficient splitting for effectively clustering the plurality of financial accounts.

46. The system of claim 43, wherein the processor is further operable to execute the computer-executable instructions to:
receive a new financial account not in the plurality of financial accounts;
process the new financial account against the decision tree to determine that the new financial account is to be placed into the first risk group; and
assign the first value for the type of overdraft limit to the new financial account.

47. The system of claim 43, wherein the processor is further operable to execute the computer-executable instructions to tune the decision tree based at least in part on additional data associated with the plurality of financial accounts.

48. The system of claim 47, wherein the additional data comprises at least one of (i) limits used, (ii) fees generated, or (iii) charge-offs incurred.

49. The system of claim 47, wherein the processor is further operable to execute the computer-executable instructions to obtain the additional data from at least one of (i) a Demand Deposit Account System, (ii) an Exceptions System, (iii) a Customer Information System, (iv) an Online Authorization System, and (v) a Charge-Off Collection System.

50. The system of claim 26, wherein the processor is further operable to execute the computer-executable instructions to adjust at least one of the first value for the type of overdraft limit for the first risk group or the second value for the type of overdraft limit for the second risk group based at least in part on at least one of: a change in bank offerings, a change in the accounts comprising the first risk group or the second risk group, a change in bank procedures, or a change in bank policy.

* * * * *

UNITED STATES PATENT AND TRADEMARK OFFICE
CERTIFICATE OF CORRECTION

PATENT NO. : 7,617,156 B1 Page 1 of 1
APPLICATION NO. : 11/457698
DATED : November 10, 2009
INVENTOR(S) : Steven Wolfson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 438 days.

Signed and Sealed this

Fourteenth Day of December, 2010

David J. Kappos
*Director of the United States Patent and Trademark Office*